United States Patent
Lindskog

(10) Patent No.: US 6,935,102 B2
(45) Date of Patent: Aug. 30, 2005

(54) METHOD OF CONTROLLING THE CONCENTRATION OF NITROGEN OXIDES, HYDROCARBONS AND CARBON MONOXIDE IN CONJUNCTION WITH THE CLEANSING OF EMISSION GASES

(75) Inventor: Nils Lindskog, Göteborg (SE)

(73) Assignee: Sandvik AB, Sandviken (SE)

(*) Notice: Subject to any disclaimer, the term of this patent is extended or adjusted under 35 U.S.C. 154(b) by 0 days.

(21) Appl. No.: 10/332,457

(22) PCT Filed: Mar. 23, 2001

(86) PCT No.: PCT/SE01/00634

§ 371 (c)(1),
(2), (4) Date: Oct. 10, 2002

(87) PCT Pub. No.: WO01/86124

PCT Pub. Date: Nov. 15, 2001

(65) Prior Publication Data

US 2003/0140619 A1 Jul. 31, 2003

(30) Foreign Application Priority Data

Apr. 19, 2000 (SE) .............................. 0001457

(51) Int. Cl.[7] .................................................. F01N 3/00
(52) U.S. Cl. ............................. 60/285; 60/274; 60/289; 60/299
(58) Field of Search ........................ 60/274, 285, 289, 60/301

(56) References Cited

U.S. PATENT DOCUMENTS

| 5,136,842 A | | 8/1992 | Achleitner et al. ............ 60/274 |
| 5,235,956 A | * | 8/1993 | Yoshizaki ..................... 123/585 |
| 5,293,740 A | | 3/1994 | Heppner et al. ............... 60/274 |
| 5,551,231 A | * | 9/1996 | Tanaka et al. ................. 60/289 |
| 5,746,049 A | * | 5/1998 | Cullen et al. .................. 60/274 |

FOREIGN PATENT DOCUMENTS

| EP | 0 555 936 A1 | 8/1993 |
| WO | WO 99/20375 | 4/1999 |

\* cited by examiner

*Primary Examiner*—Thomas Denion
*Assistant Examiner*—Diem Tran
(74) *Attorney, Agent, or Firm*—Alfred J. Mangels

(57) ABSTRACT

A method of controlling the concentration of nitrogen oxides, hydrocarbons, and carbon monoxide in waste gases. A first lambda value (λ1) of the air-fuel mixture is set to less than 1. The gases pass through a first catalyst and then through a second catalyst. The CO-concentration of the gases in the first catalyst is sufficiently high to reduce $NO_x$ to $N_2$ so that the NOx concentration is reduced to a predetermined value. Oxygen ($O_2$) is introduced between the first catalyst and the second catalyst to oxidize both CO and HC to $CO_2$ and $H_2O$, to reduce the CO-concentration to a predetermined value. A second lambda value (λ2) is measured in the gases downstream of the second catalyst, and a valve for regulating the air-fuel ratio is controlled so that the second lambda value (λ2) lies within a predetermined range whose lower limit is higher than 1.

5 Claims, 3 Drawing Sheets

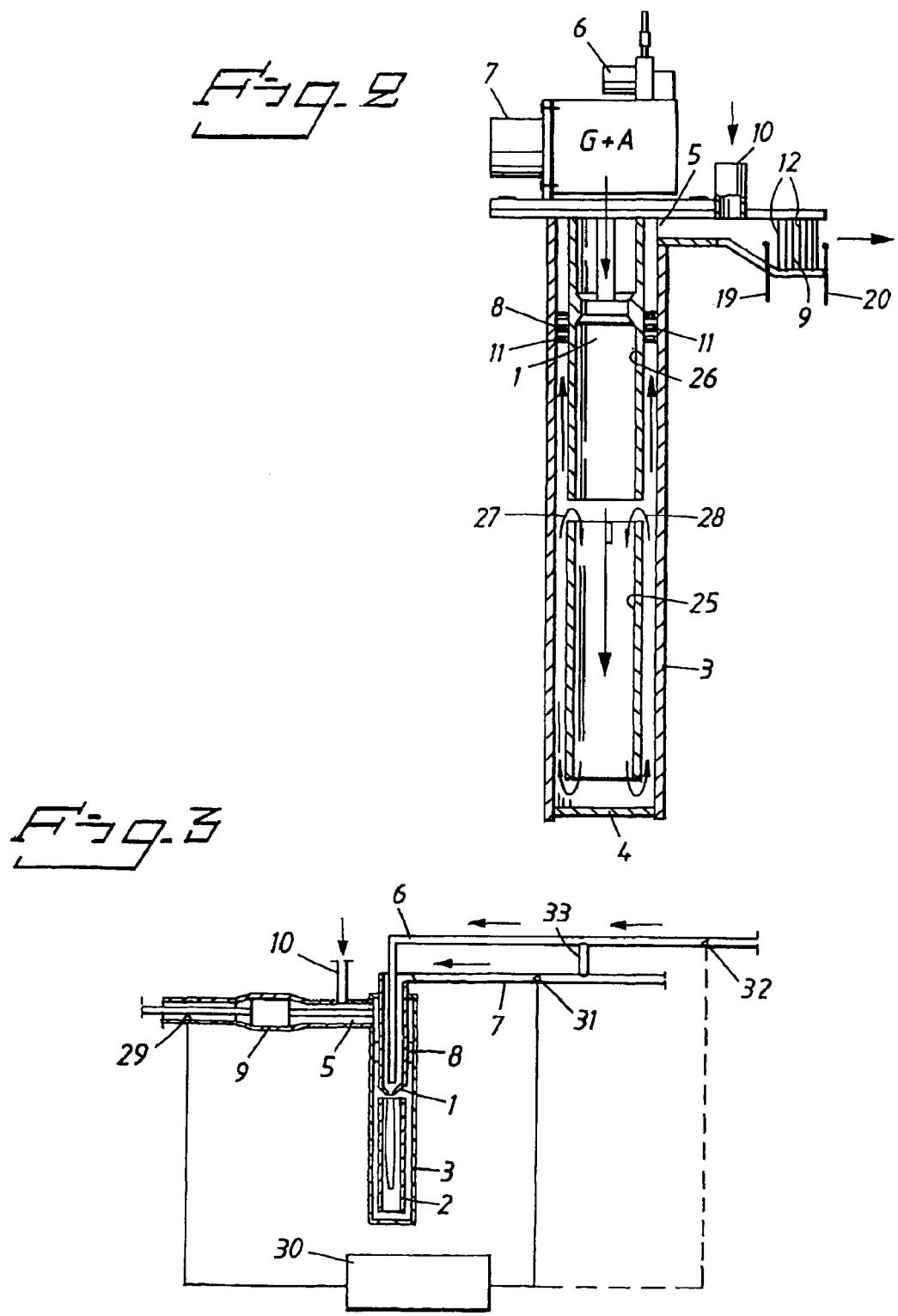

METHOD OF CONTROLLING THE CONCENTRATION OF NITROGEN OXIDES, HYDROCARBONS AND CARBON MONOXIDE IN CONJUNCTION WITH THE CLEANSING OF EMISSION GASES

BACKGROUND OF THE INVENTION

1. Field of the Invention

The present invention relates to a regulating system for controlling the concentration of nitrogen oxides ($NO_x$), hydrocarbons (HC) and carbon monoxide (CO) in conjunction with the cleansing of emission gases, and also to a device for this purpose.

2. Description of the Related Art

There is described in Swedish Patent Specification No. 9800473-2 a method of cleansing waste gases, e.g., fumes or exhaust gases, from a gas burner or some other combustion source, such as an oil-fired burner or an internal combustion engine. The invention also relates to a gas burner in which said method is exploited.

It is common practice to heat industrial furnaces with the aid of gas burners. Natural gas is a typical fuel in this respect, although other gases may be used, for instance propane, butane, and LP-gas.

An effective gas burner is, for instance, one where the burner head is placed at one end of an inner tube which is surrounded by a protective tube that has a closed bottom. The fumes from the burner chamber pass inside the inner tube, down to the bottom of the outer tube, and there turn and flow up between the outer and the inner tubes in the opposite direction, and then into an exhaust channel that leads to the surroundings. The protective tube emits heat to a furnace space, this heat being 30% convection heat and 70% radiation heat.

A similar type of burner also includes an inner tube which is surrounded by an outer protective tube, but where the bottom of the protective tube is not closed. The protective tube extends in an arched shape, for instance a U-shape, where the free end of the protective tube is connected to an exhaust channel. The inner tube carrying the burner head is straight and is thus located within the straight part of the protective tube. Such gas burners emit high concentrations of hydrocarbons (HC) and nitrogen compounds ($NO_x$).

It is desirable to maintain the outer tube at a temperature of up to 1150–1200°C., so as to enhance the power concentration of the burner. This can be achieved by constructing the outer tube from a high temperature material, such as from silicon carbide (SiC) or APM. APM is an acronym for Advanced Powder Metallurgy, this material comprising about 73% Fe, 22% Cr and 5% Al and which is extruded to a tubular shape.

However, the $NO_x$ concentration in the waste gases increases significantly at such high temperatures.

One problem occurring at high temperatures is that the catalyst is subjected to high thermal stresses, and hence a conventional catalyst that includes ceramic monoliths can be destroyed unless cooled.

The invention defined in the patent specification identified above affords a solution to these problems and results in much lower concentrations of CO and $NO_x$, as well as HC, than those achieved with conventional catalytic waste gas purification processes.

The patent specification identified above relates to a method of cleansing from waste gases their nitrogen oxide ($NO_x$), hydrocarbon (HC), and carbon monoxide (CO) contents, for instance burner fumes and internal combustion engine exhaust gases. The gases are caused to pass through a catalyst for catalytic purification of said gases. According to that patent specification, the lambda value is caused to lie beneath a value $\lambda=1$. The waste gas, or exhaust gas, is conducted through a first catalyst and thereafter through a second catalyst, wherein the CO-concentration of the gas is caused to be sufficiently high in the first catalyst to reduce the $NO_x$, concentration to $N_2$ to an extent such as to bring the $NO_x$ concentration down to a predetermined value, and wherein a sufficiency of oxygen is introduced between the first and the second catalyst such as to oxidize both CO and HC to $CO_2$ and $H_2O$ to an extent such as to bring the CO-concentration down to a predetermined value.

One significant problem with practicing the invention according to said patent is that the lambda value cannot be measured directly, but must be measured indirectly.

This problem is solved by the present invention, which enables active regulation to be effected during operation of the system.

SUMMARY OF THE INVENTION

Accordingly, the present invention relates to a method of controlling the concentration of nitrogen oxides ($NO_x$), hydrocarbons (HC) and carbon monoxide (CO) of waste gases, such as burner fumes and the exhaust gases of internal combustion engines. The gases are conducted through a catalyst for catalytic cleaning of the gases, where a first lambda value ($\lambda 1$) of supplied fuel mixture is caused to lie beneath a value $\lambda=1$. The gases are conducted through a first catalyst and then through a second catalyst, wherein in the first catalyst the CO-concentration is caused to be sufficiently high to reduce $NO_x$ to $N_2$ to an extent such that the $NO_x$ concentration will be brought down to a predetermined value. Oxygen ($O_2$) is supplied between the first catalyst and the second catalyst in an amount sufficient to oxidize CO and HC to $CO_2$ and $H_2O$ to an extent such as to bring the CO-concentration down to a predetermined value. A second lambda value ($\lambda 2$) is measured or determined in the waste gas downstream of said second catalyst with the aid of a measuring device that is adapted to deliver a signal to a microprocessor or corresponding device that has an associated memory. A valve for regulating the delivered amount of oxygen in relation to the delivered amount of fuel is controlled by said microprocessor so as to cause said second lambda value ($\lambda 2$) to lie within a predetermined range whose lower limit is higher than a value $\lambda=1$.

BRIEF DESCRIPTION OF THE DRAWINGS

The invention will now be described in more detail partly with reference to exemplifying embodiments of the invention shown in the accompanying drawings, in which:

FIG. 2 is a schematic sectional view of a burner according to an alternative embodiment;

FIG. 3 is a schematic illustration of an inventive regulating system;

DESCRIPTION OF THE PREFERRED EMBODIMENTS

Figure 1:
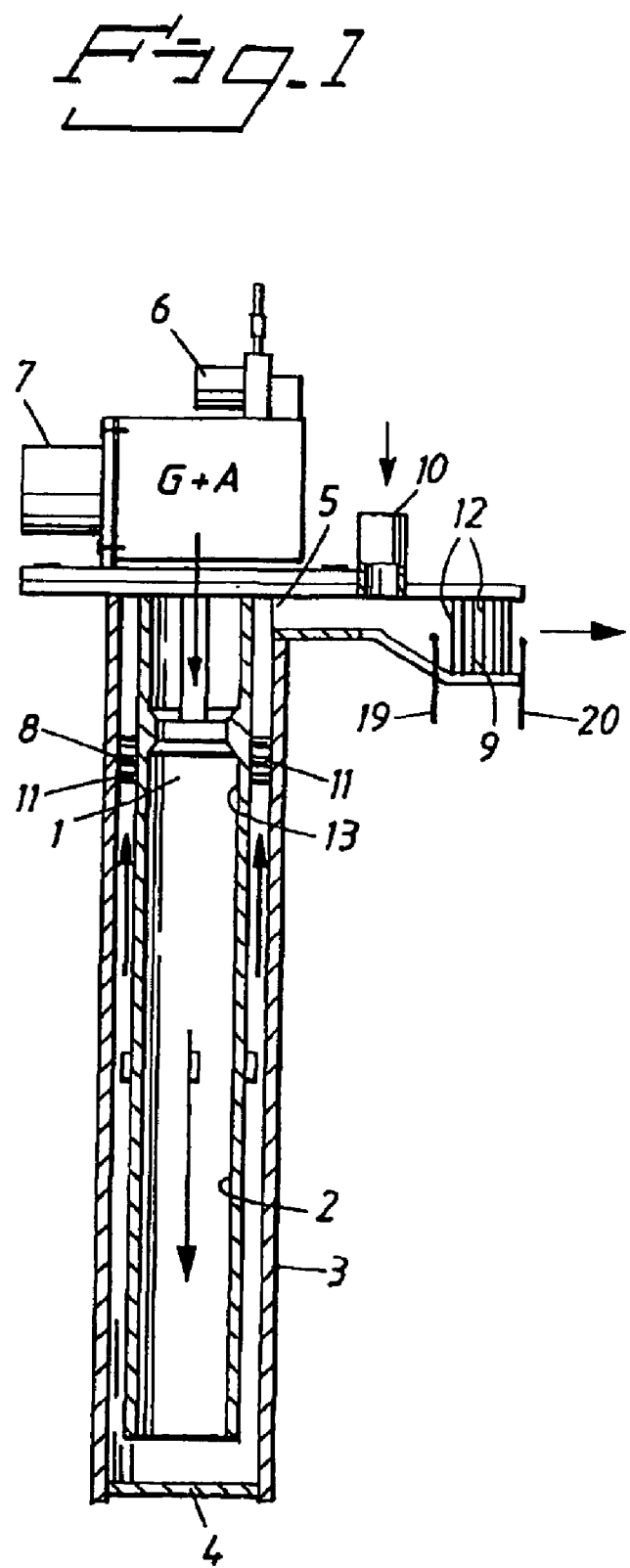
FIG. 1 is a schematic cross-sectional view of a gas burner according to a first embodiment.

FIG. 1 illustrates a furnace-heating gas burner of a known kind. In this type of burner, the burner head 1 is placed in one end of an inner tube 2 that is surrounded by an outer protective tube 3. The protective tube 3 is closed at its bottom 4. This means that the fumes or waste gases from the burner head will pass down in the inner tube 2 onto the bottom 4 of the outer tube 3, where they turn and flow in an opposite direction between the outer and inner tubes and thereafter into an exhaust gas passageway 5 that leads to the surroundings.

The invention is not limited to any particular gas burner or to any other burner, but may equally as well have been described with reference to the above-mentioned U-shaped type of burner, which also has an inner tube surrounded by an outer protective tube, but where the bottom of the protective tube is open and curves in an arch and where its free end is connected to an exhaust gas passageway. A recuperator is comprised of that part of the inner tube 2 which surrounds the burner head or, alternatively, of a separate tube that surrounds said burner head and where a special inner tube is provided in the extension of said separate tube. This separate tube and the special inner tube are thus axially in line with each other. The special inner tube begins at the open end of said separate tube.

A gaseous fuel is delivered to an inlet 6 and air is delivered to an inlet 7.

Two catalysts 8, 9 are placed mutually sequentially in the flow direction. At a sufficiently high CO-concentration of the exhaust gas, the first catalyst 8 functions to reduce $NO_x$, to $N_2$ to an extent such as to bring the $NO_x$ concentration down to a predetermined value. Further, there is provided an oxygen ($O_2$) inlet 10 between the first catalyst 8 and the second catalyst 9. When oxygen is supplied to the inlet 10, the second catalyst functions to oxidize CO and HC to $CO_2$ and $H_2O$ to an extent such that the CO-concentration will decrease to a predetermined value. The oxygen supplied is preferably air.

According to the previously-identified patent specification, the lambda value ($\lambda$) is brought to beneath a value=1. A suitable lambda value is from 0.940 to 0.995. The exhaust gas is thus caused to flow through the first catalyst 8 and then through the second catalyst 9. Because of the substochiometric lambda value in the first catalyst, the CO-concentration is caused to be sufficiently high for $NO_x$ to be reduced to $N_2$ to an extent such as to bring down the $NO_x$, concentration to a predetermined value, The $NO_x$-reducing reaction can be written as $NO_x + CO \rightarrow \frac{1}{2} N_2 + CO_2$. An increase in the CO-concentration of the exhaust gas drives this reaction further to the right.

The exhaust gas that flows out from the first catalyst 8 contains substantially CO and hydrocarbons HC.

Oxygen ($O_2$) is supplied between the first catalyst 8 and the second catalyst 9 in a quantity sufficient to oxidize both CO and HC to $CO_2$ and $H_2O$ to an extent such as to bring down the CO-concentration to a predetermined value. The oxygen is preferably supplied by causing air to flow in through the inlet 10. The reactions that take place in the second catalyst 9 can be written as $CO + \frac{1}{2} CO_2$ and $H_nC_m + (m+n/2) O_2 \rightarrow mCO_2 + n/2 H_2O$. Both of these reactions can be driven much further to the right when sufficient oxygen is delivered through the inlet 10.

Thus, CO is the $NO_x$-reducing fuel.

One or both of the catalysts 8, 9 may have the form of a net structure of woven, high-temperature wire that has been coated with a layer that includes rhodium, platinum, and palladium as catalysts, or may include catalysts of other types.

Such a ring-shaped net structure in the first catalyst 8 is referenced 11 in FIG. 1, while a disc-shaped net structure in the second catalyst 9 is referenced 12. The first catalyst 8 is positioned between the inner tube 2 and the outer tube 3 in the location of the recuperator 13, while the second catalyst 9 is positioned in the exhaust gas passageway.

It is preferred to supply air between the catalysts in an amount corresponding to about 10–20% of the amount of combustion air delivered to the burner.

FIG. 2 illustrates an alternative embodiment of a burner according to FIG. 1 In this alternative embodiment, the inner tube is divided into two mutually sequential inner tubes 25, 26 as seen in the axial direction. The longitudinal spacing between the inner tubes 25, 26 may be 20–30 millimeters or slightly greater. In the case of this embodiment, the fumes or exhaust gases are caused to partially recirculate around the lower inner tube 25, as indicated by the arrows 27, 28.

It has been said above that gaseous fuel is delivered to the inlet 6 and air is delivered to an inlet 7. It has been found that combustion is more complete when the fuel is mixed well with the air of combustion. For this reason, a given quantity of air is supplied together with the fuel in the fuel inlet 6 in accordance with one preferred embodiment whereas the remainder of the combustion air is delivered through the inlet 7. This applies both to the burner of FIG. 1 and the burner of FIG. 2.

What has been said above is also apparent from the initially mentioned patent specification.

FIG. 3 illustrates a burner of the same kind as that shown in FIG. 1.

According to the present invention, a second lambda value ($\lambda 2$) is measured in the exhaust gas downstream of said second catalyst, with the aid of a measuring device 29. The measuring device 29 is preferably a lambda probe. This probe is designed to deliver a signal to a microprocessor 30 or some corresponding means that has an associated memory. In said memory the set point values are stored.

The FIG. 3 embodiment also includes a valve 31 for regulating the oxygen supply in relation to the fuel supply. The valve is controlled by the microprocessor 30 such as to cause the second lambda value ($\lambda 2$) to lie within a predetermined range stored in the memory of the microprocessor. A further valve 32 may be provided in the fuel conduit 6, said further valve also being controlled by the microprocessor 30. The fuel mixture delivered to the burner may be controlled by one or by both of said valves. The second lambda value is always greater than 1, meaning that it can be measured readily with known technology.

The present invention is based on the realization that very good correlation prevails between the second lambda value and the concentrations of $NO_x$ and CO downstream of the second catalyst 9.

Figure 4:
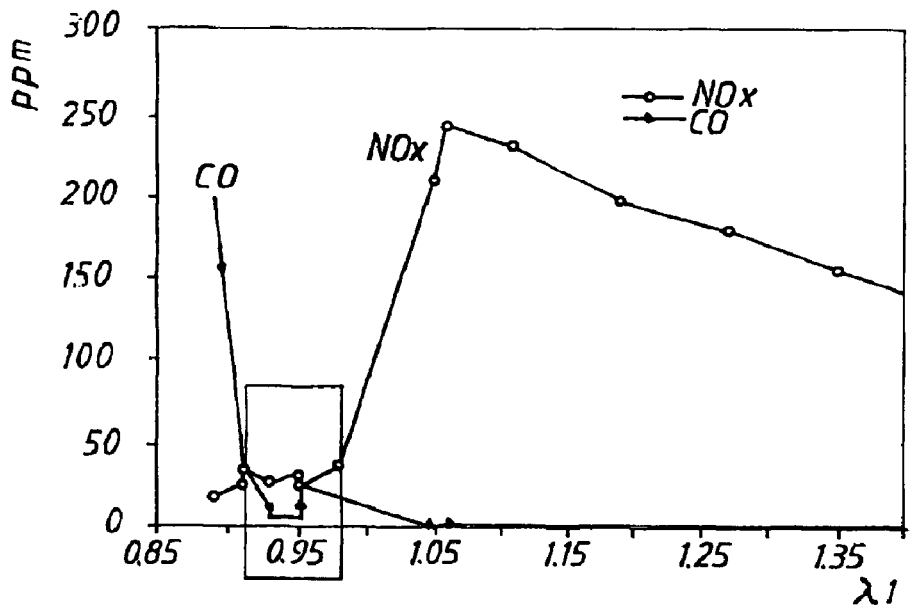
FIG. 4 is a diagram relating to the concentration of $NO_x$ and CO as a function of the lambda value of the delivered fuel mixture.

According to one preferred embodiment the first lambda value is caused to lie in a range of 0.92–0.96. This will be evident from FIG. 4, which shows the concentrations of $NO_x$ and CO downstream of the second catalyst 9 for different magnitudes of the first lambda value $\lambda 1$. It will also be evident from the diagram that there is a preferred operation window, shown as a rectangle, within which the concentrations of $NO_x$ and CO are low. The concentrations are below 50 ppm within this window.

Figure 5:
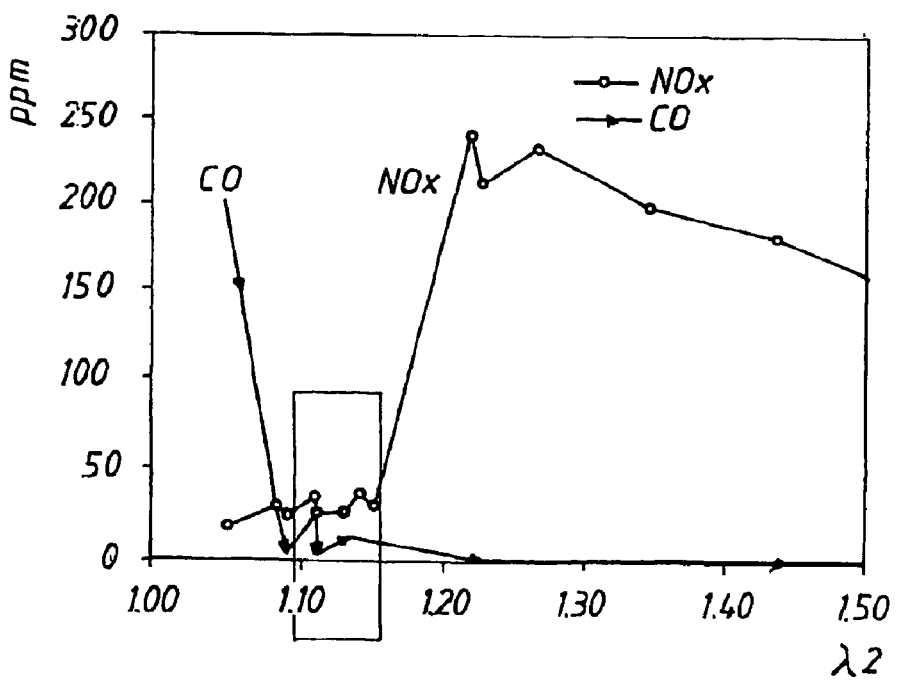
FIG. 5 is a diagram relating to the concentration of $NO_x$ and CO as a function of the lambda value downstream of a second catalyst in a burner that has a power of 12 KW.

FIG. 5 is a corresponding diagram in respect of the second lambda value $\lambda 2$. This diagram includes a corresponding window in a range of 1.09 and 1.16 in respect of $\lambda 2$.

In FIG. 3, the numeral 33 identifies a conduit for delivering a given quantity of mixing air to the fuel in the conduit 6. The amount of air passing through the conduit 6 is adjusted so that no black fumes will be generated. Black fumes, or black smoke, occurs when the mixing air flow is too low and $\lambda 1$ is below 1. The CO-concentration also rises when the flow is too low. On the other hand, the $NO_x$, concentration increases at all values of $\lambda 1$, when the flow is too high. Normally, the amount of mixing air will correspond approximately to 5–15% of the combustion air in the conduit 7.

With regard to the flow of the secondary air delivered via the conduit 10, this flow must be sufficiently high to oxidize the excess CO subsequent to the reaction with $NO_x$. If the flow is too high, the temperature in the second catalyst will become too high and $NO_x$ will form.

The flow of mixing air and secondary air must be adapted to the type of burner concerned, so that a minimum of $NO_x$ and CO will be obtained at the best lambda values. When this is done, control can be effected by means of the value of $\lambda 2$.

FIG. 5 shows a framed range or interval for $\lambda 2$. It has been found, however, that the range varies somewhat in relation to the type of burner concerned and its power. Accordingly, it is necessary to determine the range for each type of burner. Adjustments can then be made in the range concerned, with the aid of $\lambda 2$.

A list of examples of ranges for different burners follows:

| Burner (KW) | $\lambda$-value | $NO_x$ conc. (ppm) | CO-conc. (ppm) |
|---|---|---|---|
| 10 | 1.03–1.17 | <60 | <40 |
| 12 | 1.08–1.16 | <50 | <50 |
| 14 | 1.02–1.14 | <50 | <20 |
| 20 | 1.05–1.13 | <50 | <50 |

If the lambda value $\lambda 2$ is too low, the supply of combustion air shall be increased or the supply of gas decreased. If the lambda value is too high, the supply of combustion air shall be decreased or the supply of gas increased.

Although the present invention has been described above with reference to cleaning gas burner fumes, it will be obvious that the inventive method can be applied equally as well in respect of fumes from other types of burners and also with respect to cleaning the exhaust gases from internal combustion engines, such as diesel engines and gasoline engines.

It will also be apparent that the present invention solves the problems mentioned in the introduction.

It will thus be understood that the invention can be modified and adapted to different conditions such as types of burner and types of engine, and so on, without departing from the inventive concept, namely the concept of regulating the fuel-air mixture on the basis of the lambda value downstream of the second catalyst.

The present invention shall not therefore be considered restricted to the above-described embodiments thereof, as variations and modifications can be made within the scope of the accompanying claims.

What is claimed is:

1. A method of controlling the concentration of nitrogen oxides ($NO_x$), hydrocarbons (HC) and carbon monoxide (CO) in waste gases, such as burner fumes and the exhaust gases of internal combustion engines, wherein the waste gases are passed through a catalyst for catalytic cleansing of said gases, said method comprising the steps of: establishing a first lambda value ($\lambda 1$) of a supplied fuel-air mixture to be less than a value $\lambda=1$; passing the products of combustion of the supplied fuel-air mixture as waste gases through a first catalyst and then through a final catalyst, wherein the gases escape directly to the atmosphere after the final catalyst, and wherein the CO-concentration of the gases passing through the first catalyst is sufficiently high to reduce $NO_x$ to $N_2$ so that the $NO_x$ concentration is reduced to a predetermined value; introducing oxygen ($O_2$) into the gases between the first catalyst and the final catalyst in a quantity sufficient to oxidize both CO and HC to $CO_2$ and $H_2O$ so that the CO-concentration is reduced to a predetermined value; measuring a final lambda value ($\lambda 2$) in the waste gases at a point downstream of said final catalyst; transmitting a signal representative of the final lambda value to a control device that has an associated memory; and controlling a an airflow control valve positioned in an air inlet conduit upstream of a combustion zone for regulating inlet oxygen supply in relation to inlet fuel supply of the supplied fuel-air mixture at a fuel-air inlet upstream of the combustion zone based upon an output provided by the control device, so that said final lambda value ($\lambda 2$) is within a predetermined range whose lower limit is higher than a value $\lambda=1$.

2. A method according to claim 1, wherein the first lambda value ($\lambda 1$) is within the range of 0.92 to 0.96.

3. A method according to claim 1, including the step of controlling a fuel flow control valve for regulating the flow of inlet fuel flow for combustion based upon an output provided by the control device to regulate the final lambda value ($\lambda 2$).

4. A method according to claim 1, including the step of establishing said predetermined range for the final lambda value ($\lambda 2$) by determining the concentration of $NO_x$, HC and CO downstream of the final catalyst for different magnitudes of the final lambda value ($\lambda 2$).

5. A method according to claim 1, wherein the oxygen introduced into the waste gases is provided from a source other than the air inlet conduit.

* * * * *